(12) United States Patent
Slaghek et al.

(10) Patent No.: US 7,597,753 B2
(45) Date of Patent: Oct. 6, 2009

(54) COVER LAYERS TO PREVENT WEED GROWTH

(75) Inventors: Theodoor Maximilaan Slaghek, Rotterdam (NL); Willem Cornelis Drost, Zeist (NL)

(73) Assignee: Nederlandse Organisatie Voor Toegepast-Natuurwetenschappelijk Onderzoek Tno, Delft (NL)

( * ) Notice: Subject to any disclaimer, the term of this patent is extended or adjusted under 35 U.S.C. 154(b) by 0 days.

(21) Appl. No.: 10/535,968

(22) PCT Filed: Nov. 18, 2003

(86) PCT No.: PCT/NL03/00807

§ 371 (c)(1), (2), (4) Date: May 23, 2005

(87) PCT Pub. No.: WO2004/047520

PCT Pub. Date: Jun. 10, 2004

(65) Prior Publication Data

US 2005/0279019 A1    Dec. 22, 2005

(30) Foreign Application Priority Data

Nov. 22, 2002 (NL) .................................... 1021978

(51) Int. Cl.
*C08L 1/02* (2006.01)
*C09D 101/02* (2006.01)

(52) U.S. Cl. ................................................. 106/125.1
(58) Field of Classification Search ............... 106/125.1
See application file for complete search history.

(56) References Cited

U.S. PATENT DOCUMENTS 6,440,204 B1 * 8/2002 Rogols et al. ............ 106/134.1

FOREIGN PATENT DOCUMENTS

| CA | 1 084 290 A | 8/1980 |
| DE | 700 077 | 12/1940 |
| EP | 1 066 751 A2 | 1/2001 |
| WO | WO 96/09355 | 3/1996 |
| WO | WO 00/22916 A | 4/2000 |
| WO | WO 00/58085 | 10/2000 |

OTHER PUBLICATIONS

Derwent Publications Ltd., London, GB; AN 1990-259219,(Feb. 7, 1990,)XP002249622.
Derwent Publications Ltd., London, GB; AN 1989-237672,(Jul. 7, 1989,) XP002249624.

* cited by examiner

*Primary Examiner*—David M Brunsman
(74) *Attorney, Agent, or Firm*—Lucas & Mercanti, LLP

(57) ABSTRACT

The invention relates to a soil cover, a method for preventing weed growth by using a soil cover, the use of potato steam peels and the use of a cork fraction of potato steam peels for preventing weed growth. A soil cover according to the invention comprises potato steam peels or a part, derivative or analogue thereof. In a different embodiment, a soil cover according to the invention comprises a cork fraction of potato steam peels or a part, derivative or analogue thereof.

13 Claims, No Drawings

COVER LAYERS TO PREVENT WEED GROWTH

This patent application claims the benefit of priority from Dutch Patent Application No. NL 1021978 filed Nov. 22, 2002 through PCT Application Serial No. PCT/NL2003/000807 filed Nov. 18, 2003, the contents of each of which are incorporated herein by reference.

The invention relates to a soil cover, a method for preventing weed growth by using a soil cover, the use of potato steam peels for preventing weed growth and the use of a cork fraction of potato steam peels for preventing weed growth.

The potato steam peel is a residual product of the potato processing industry and chiefly consists of carbohydrates (starch, cellulose, hemicellulose and pectin), protein and a cork fraction. The cork fraction is present in the skin of the potato. From a chemical point of view, cork consists inter alia of a number of layers of wax, cutin and suberin. These are, substantially, saturated and unsaturated fatty acids. The composition of the cork fraction is codependent on the origin of the cork material and the treatment the fraction has undergone. For instance, the cork fraction of the potato steam peel consists mainly of suberin (over 50%).

The most important market for the potato steam peels (PSP) is cattle feed. In the present invention, an alternative use for this subsidiary product flow has been developed. From previous research, it has appeared that the starch present in the PSP can be converted to alcohol via fermentation. After fermentation, a residual product is left, viz. the cork fraction. For this cork fraction too, an industrial application has been developed.

In the cultivation on the open ground and in, for instance, arboriculture or in container cultivation, use is made of plant protection products to prevent weed growth and fungus formation. These last years, this use of plant protection products has been under much pressure resulting in a growing need or alternatives. In consequence, much time is spent in developing formulations capable of preventing weed growth. An alternative to plant protection products is formed by the so-called soil covers (also called root cloths). However, as further described hereinbelow, the most important drawback of the existing soil covers is that they do not prevent weed growth well.

EP 0 143 913 describes cover plates with round or square openings that can be laid around trees or shrubs. These cover plates are made of tree bark and fertilizing agents and have the property that they slowly release nutrients into the ground, they also prevent the ground from dehydrating and prevent growth of weed.

U.S. Pat. No. 5,077,935 describes a cover layer consisting of a biologic layer (for instance straw) and a layer consisting of UV-degradable, synthetic material which latter layer is sewn to the biologic layer. Then, to the first synthetic layer, another, second synthetic layer is fastened.

Another example of a soil cover is described in WO 96/09355. This soil cover is based on glued straw.

EP 0 898 881 describes a soil cover based on the bark of coconut and WO 00/22916 describes a soil cover containing water, carbon black, a strengthening agent and fibers, while a copolymer of at least one alkene and at least one ester of an alkenoic acid is used as strengthening agent.

WO 00/58085 describes that potato steam peels can be used as binders for preventing silt migrations.

Preferably, a soil cover is to prevent the growth of weed by covering the soil (and hence, lies over the soil) so that, for instance, weed seeds present in the soil can hardly, if at all, come into contact with light and hence cannot develop into a plant. Naturally, it is desired that the soil cover does allow water and air to pass to thus promote the growth of the desired crops. In addition, a soil cover is preferably biodegradable, so that the environment is burdened as little as possible. An inventory of the current market in this field yields several products, such as, for instance, product based on tree bark, a product based on glued straw, a product consisting of inter alia vegetable fibers and a glue stock based on gum and a product consisting of 98% straw, 1% iron sulfate and 1% lignosulfonate. However, it appears that these products do not act well on, for instance, the open ground cultivation and in container growing. In particular poor covering, fungus formation, grasses growing through, inhibition of the growth of target crops, lack of dimensional stability or too rapid assimilation into the ground appear insurmountable problems in the use of the above-mentioned products.

The object of the present invention is to give a solution to these problems. The present invention discloses that potato steam peels and/or the cork fraction of the potato steam peels are/is a good soil cover. These soil covers exhibit inter alia a strong reduction in grasses growing through and, depending on the composition of the soil cover, no fungus formation occurs either. Through this use, the present invention provides an alternative use of the PSP and an alternative soil cover, capable of obviating at least a part of the drawbacks of the current soil covers.

The object of the invention is achieved by a soil cover comprising potato steam peels or a part, derivative or analogue thereof. The object of the invention is also achieved by a soil cover comprising a cork fraction of potato steam peels or a part, derivative or analogue thereof.

The word part "soil" in the term "soil cover" should be understood in a broad sense. Here, it relates to any soil that can be used for growing and/or cultivating plants. For instance the growth and/or cultivation on the cold, open ground (such as, for instance, the growth in an open field), the growth and/or cultivation in a container, the growth and/or cultivation in greenhouses, but also growing and/or cultivating under domestic circumstances.

As stated, potato steam peels (PSP) are a residual product of the potato processing industry and consist, chiefly, of carbohydrates (starch, cellulose, hemicellulose and pectin), protein and a cork fraction. The composition of the PSP on the basis of dry weight is as follows: carbohydrates (starch and hemicellulose) 40-60%, cellulose 2-5%, remaining organic substances 20-25%, protein 8-12%, fat 0.5-2% and inorganic material 4-8%. It is clear to the skilled person that compositions meeting the above-represented composition can be used for the present invention, independently of the manner in which they have been established. A different example of a crop whose skin can be removed by steam is tomato. A preferred embodiment relates to the use of potato steam peels or a cork fraction of potato steam peels, because the starch present is capable of forming a dense layer. The material and method section describes a method with which the PSP can be obtained. However, it is clear to the skilled person that the PSP can also be obtained in a different manner, for instance by mechanical or manual peeling.

The cork fraction is present in the skin of the potato. By treating the PSP with enzymes capable of hydrolyzing starch (for instance Termamyl, amylases and cyclodextrin glycosyltransferases (CGT-ases)), the starch fraction is (partially) hydrolyzed and a cork fraction is obtained which is representative of the fraction obtained after fermentation of starch to alcohol.

Herein, the term "or a part, derivative or analogue thereof" is inter alia understood to mean a soil cover comprising a part of the PSP. Here, in particular, for instance the cork fraction of the PSP is involved. The present invention gives several examples of a derivative of PSP, such as, for instance, chemically modified PSP. Herein, the term analogue is understood to mean any other substance which, with respect to composition, approximates the composition of the PSP. An important preference a soil cover according to the invention has to meet is the capacity to form a dense layer, so that weeds cannot grow through. A dense layer is obtained when polymers such as starch and/or hemicellulose are present in the layer. Preferably, these polymers are already present in the peels or in the cork fraction (internal polymers), so that separate addition of polymers (so-called external polymers) can be avoided. However, external polymers too such as polyacrylates and latex can be used for forming a dense layer. That is why it is clear to the skilled person that an analogue of the soil cover according to the invention must at least contain one internal or external polymer. In a preferred embodiment, the soil cover comprising the potato steam peels and/or a cork fraction of potato steam peels is at least partially dried. Preferably, the dry matter percentage is between 40% and 90%. The spread of the dry matter percentage is influenced for an important part by the air humidity and this air humidity will effect an eventual equilibrium. The at least partially dried PSP or a cork fraction of the PSP can then be easily ground so that a more uniform particle size is obtained. This promotes a simple scattering and also enables a more uniform distribution of the soil cover and therefore eventually results in a field which is preferably covered on all desired locations.

In a different preferred embodiment, the potato steam peels or the cork fraction of the potato steam peels have undergone a chemical modification, at least partially. Preferably, the (external and/or internal) carbohydrates present and, more preferably, the (external and/or internal) starch present are/is chemically modified. As a result, the amount of carbohydrates/starch available is then reduced and fungus formation is reduced and preferably completely prevented. Preferably, the chemical modification is oxidation and, more preferably, partial oxidation. Herein, a partial oxidation reaction is defined as a reaction in which between 1% and 100% of the carbohydrates present is/are oxidized. Preferably, at least 20-80%, more preferably, at least 30-70% of the carbohydrates are oxidized. It has appeared that an increase of the percentage of oxidized carbohydrates results in less fungus growth. That is why the situation where 90% of the carbohydrates have been oxidized is greatly preferred. However, it has appeared that lower oxidation percentages cap be admirably compensated by the addition of fungicides. The material and method section, as described herein, describes several protocols for carrying out an oxidation reaction. The percentage of carbohydrates that is oxidized is codetermined by the amount of oxidant used. The products can differ in composition since different types of reaction conditions result in specific regioselective modifications. An example is the use of 2,2,6,6-tetramethyl-piperidine-1-oxyl (TEMPO). This molecule, in combination with an oxidant such as caustic bleach, effects that virtually exclusively primary hydroxyl groups are oxidized to carboxylic acids, while in the absence of TEMPO, virtually exclusively the vicinal diol system in, for instance, glucose is oxidized to a dicarboxylic compound. Other examples of chemical modifications are substitution with monochloroacetic acid, hydrophobing with octenyl succinic acid, acetylation with acetic acid anhydride or cross-liking with sodium trimetaphosphate and epichlorohydrin. It has appeared that the polymeric carbohydrates, in particular starch, can be easily modified. With this, the properties of the cover layers to be formulated can be influenced. Due to these modifications, the amount of non-substituted carbohydrates decreases and hence the risk of fungus formation decreases too. It is clear to a skilled person that a soil cover according to the invention can also consist of a mixture of modified and non-modified potato steam peels and/or the cork fraction of potato steam peels.

In another preferred embodiment, to the soil cover comprising potato steam peels and/or a cork fraction of potato steam peels, also, at least one additive has been added. An additive can have different functions. For instance, an oil having the function of a binder can be considered, a fungicide to prevent fungus growth, a herbicide to prevent weed growth or fertilizers for promoting/stimulating the growth of the desired crops.

Preferably, the additive is an oil. Oil is used as a binder for other hydrophobic compounds. Because of possible BSE problems with animal oils, preferably, a vegetable oil is used. An additional advantage of vegetable oils is the presence of unsaturated fatty acid chains that can form a network and, in this manner, contribute to the stability of the soil cover. Examples of a vegetable oil are palm oil, soy and sunflower oil. From the point of view of costs, palm oil is preferred.

In yet another embodiment, to a soil cover according to the invention a fungicide has been added as additive. When no oxidation and/or chemical modification is used or when partial oxidation and/or chemical modification is used, the soil cover can generally further contain food sources for microorganisms in general and for fungi in particular. As a result, fungi, for instance. are capable of using the soil cover as a nutrient source. To prevent this, a fungicide is added. The fungicide effects at least a delay in the fungus growth and preferably, flmgus growth is completely inhibited. An example of a fungicide as used in the examples is lignin or a lignin derivative. An example of a lignin derivative is lignin sulfonate. It is clear to the skilled person that the selection of fungicides is wide and a list of current fungicides can be found, for instance, on the internet. An overview of fungicides based on the internet is given in Table 1. However, since the internet is not complete and as this list is also subject to changes, the enumeration of fungicides in Table 1 should not be construed as being limitative of the present invention.

In yet another embodiment, to the soil cover according to the invention a herbicide has been added as an additive. From the examples of the present patent application, it appears that a soil cover according to the invention prevents gennination of seeds present in the soil as well as germination of seeds present on the soil cover. By adding a herbicide, undesired germination can be reduced even more. Also, in the ease weed growth were to occur, for instance in the case that soil is blown on the soil cover or a different source of germination ends up on the soil cover, it is possible to also add a herbicide to the soil cover. It is clear to the skilled person that the selection of herbicides is xvide and a list of current herbicides can be found, for instance, on the internet. An overview of herbicides based on the internet is given in Table 2. However, since the internet is not complete and as this list is also subject to changes, the enumeration of herbicides in Table 2 should not be construed as being limitative of the present invention.

In a different embodiment, to a soil cover according to the invention, as additive, a food supplement for plants has been added. Preferably, the food supplements to be added are adapted to the specific crop which is cultivated and/or grown on the soil covered by the so cover. In this type of uses, the soil cover has at least two functions, viz. preventing weed growth and promoting, for instance, the growth of a desired crop by releasing one or more food supplements. When food supplements are added, for instance the addition of commercially available fertilizers can be considered. The expert skilled person is capable of selecting the proper fertilizers for particular crops and adding them to a soil cover according to the invention. Non-limitative examples are trace elements such as manganese, magnesium and the like or nitrogen-containing and phosphate-containing inorganic salts.

In another alternative embodiment, to a soil cover according to the invention, a pesticide has been added as additive. Here, for instance anti-nematode agents can be considered. It is clear to the skilled person that the selection of pesticides is wide and a list of current pesticides can be found on, for instance, internet page http://wizard.arsusda.gov/acsl/ppdb3.html. An overview of pesticides based on this internet site is given in Table 3. However, since this internet site is not complete and as this list is also subject to changes, the enumeration of pesticides in Table 2 should not be construed as being limitative of the present invention.

Naturally, use can also be made of combinations of different additives, for instance a fungicide and a herbicide et cetera.

Depending on the eventual composition, a soil cover according to the invention preferably has a number of properties the current soil covers do not have. From the Examples, it appears that the cover layers formed are water and air permeable, form a uniform layer and are capable of covering the entire surface. All formulated layers have an inhibitory action on weed growth (weed sown before the layer is applied as well as weed sown after the layer has been formed). A soil cover according to the invention is also capable of preventing the growth of grasses. Depending on the formulation used, it is also possible to form a layer which, under the given circumstances, does not exhibit fungus formation.

The invention also provides a method for preventing weed growth by using a soil cover comprising PSP or a cork fraction of the PSP. The soil cover can be applied in different manners. For instance, it is possible to dry the soil cover, to optionally grind it and scatter it in dry condition. This method finds use for instance in container growth. Due to the low specific weight of the soil cover, the scattering can be easily effected. However, in an open field, the low specific weight may lead to the soil cover being blown away. To prevent this, in an open field situation, the soil cover is preferably applied in wet condition, (for instance via spraying) or a soil cover applied in dry condition is wetted after scattering, so that a compact soil cover is formed. Preferably, the soil cover is applied after the desired plants have germinated visibly and project above the soil, so that the desired plants are not hindered by the presence of the soil cover. Preferably, the invention therefore provides a method for preventing weed growth by using a soil cover according to the invention, characterized in that the soil cover is applied in dry condition and is subsequently moistened.

From the examples given herein, it appears that shrinkage of the soil cover can occur. Naturally, this has as a drawback that not all parts of the soil are covered, so that, in places, weed growth can still occur. In some examples, the effect of (chemical) modification, such as, for instance, substituting with monochloroacetic acid, hydrophobing with octenyl succinic acid or cross-linking with sodium trimetaphosphate and epichlorodydrin has been examined. The cover layers in which TMP (sodium trimetaphosphate) peels have been used as addition dry fastest (approximately 1 week) and exhibit the most shrinkage. The cover layers made of oxidized peels appear to remain moist the longest and exhibit little shrinkage as a result thereof. As to drying rate, the layers to which acetylated peels have been added are between cover layers with TMP peels as addition and layers with oxidized peels. These layers exhibit less shrinkage than the layers to which TMP has been added. Layers having 10% of lignosulfonate as additive appear to shrink less. From this, it appears that the eventual properties of the soil cover can be adapted to all wishes and circumstances. Preferably, the invention provides a method for reducing shrinkage of a soil cover comprising potato steam peels or a cork fraction of potato steam peels, characterized in that the soil cover comprises oxidized peels.

The invention also provides the use of potato steam peels for preventing weed growth. In addition, the invention provides the use of a cork fraction of potato steam peels for preventing weed growth.

In addition to using the soil cover by itself, it is clear that the soil cover herein described can also be used in combination with a different environmentally friendly cover layer. For instance, a combination with straw and/or saw dust can be considered.

Hereinbelow, the invention is further elucidated with reference to a number of examples. However, these examples should not be used to delimit the scope of the invention.

EXAMPLES

Material and Methods

Production of Potato Steam Peels

First, the potatoes were washed and then, the peel was removed by treating the potatoes with steam under pressure for several seconds in a pressure tank. This treatment allowed the skin to become detached from the potato, so that the peel could be removed by a brushing machine.

Termamyl Treatment (Isolation Cork Fraction from Potato Steam Peels)

To 500 g of supplied potato steam peels (both washed and unwashed) were added 500 ml of water. The temperature of the mixture is brought to 65° C. When this temperature is reached, 5 ml of Termamyl are added (720 units enzyme). Thereupon, the reaction mixture is incubated for 5 hours while being stirred. Then, the reaction mixture is filtered, whereupon the residue (the peels) is washed twice with water and once with ethanol. The remaining fraction is dried at room temperature in the air and ground with a coffee grinder.

Synthesis with Sodium Trimetaphosphate (STMP)

Recipe 1:

To 58 g of potato steam peels (washed as well as unwashed) are added 17 g of potassium hydroxide and 11 g of STMP. Subsequently, the reaction mixture is maintained at 60° C. for 5 hours. Thereupon, additional water is added (50 ml) and the reaction mixture is neutralized with 4 M HCl. Then, the reaction mixture is filtered through a P2 glass filter and the residue is rinsed with water. Thereupon, the residue is suspended in ethanol, filtered and rinsed with ethanol and dried in the air at room temperature.

Recipe 2:

To 300 grams of peels (1) are added 100 ml of water, 8 grams of NaOH and 5 grams of STMP. Then, the reaction mixture is maintained at 60° C. for 3 hours, whereupon the slurry is neutralized with 4 M HCl. Hereupon, the peels are filtered through a glass filter and rinsed with 1.5 liters of water and 1 liter of alcohol. The peels axe dried at room temperature in the air on filtering paper.

Synthesis with Monochloroacetic Acid

To 50 g of cryogenically ground potato steam peels (1) are added 15 g of sodium hydroxide and 10 g of monochloroacetic acid. The reaction mixture is stirred well for 4 hours at 65° C. Hereupon, water is added (50 ml) and neutralized with 4 M HCl. Then, the product is isolated via ethanol precipitation.

Synthesis with Octenyl Succinic Acid.

With this compound, two reactions were carried out:
1) To 50 g of peels (1) ground under nitrogen, 60 ml of water are added. Then, the mixture is brought to pH 9 with 0.5 M KOH whereupon 15 ml of octenyl succinic acid anhydride are added in 3 portions (5 ml each). During the addition, the pH is kept constant with the aid of a pH-stat. The product is isolated by rinsing it with water (approximately 1 liter).
2) To 50 g of peels (1) ground under nitrogen were added 75 ml of water pH 13 and 5 g of octenyl succinic acid anhydride. With the aid of a pH-stat, the pH is maintained constant at 9. After 30 minutes, again, 10 g of octenyl succinic acid anhydride are added. The solution appears to thicken during the reaction, but is thin again at the end of the reaction. This product is worked up as described at 1.

Oxidation of Termamyl-treated Peels in the Presence of TEMPO (2,2,6,6 tetramethyl piperidine 1 oxyl).

The oxidation of peels was carried out with TEMPO/NaCl/Br—. The carbohydrate present was oxidized maximally as well as partially. An example of a partial oxidation is described hereinbelow:

To 10 grams of peels treated with Termamyl, 250 ml of water are added and the pH is brought to 10. To the slurry are added 0.5 gram of Tempo, 0.2 gram of NaBr dissolved in water and 25 ml of NaOCl (55 meq) in portions of 5 ml. The pH is maintained at 10 with 1 M NaOH under pH stat conditions. For this reaction, in total, 45.3 mmol of NaOH are required to keep the pH constant. When no additional acid formation is observed, the reaction is stopped, the solution neutralized and filtered through a glass filter.

Oxidation of Termamyl-treated Peels with NaOCl

To 10 grams of peels 250 ml of water are added and the pH is brought to 10. To the slurry 25 ml of NaOCl are added in portions of 5 ml. The reaction proceeds considerably slower than the reaction in which TEMPO and sodium bromide are present. In total 22.8 mmol of NaOH are added. When no acid formation is observed any longer, the reaction is stopped and the slurry is neutralized and filtered.

Oxidation Peels (1)

300 grams of peels (1) are stirred up with a top stirrer in 800 ml of water. Then are added 1.0 g of TEMPO and 0.25 grams of NaBr and the pH is brought to 10 with NaOH. Then, 125 ml of NaOCl are added in portions of 5 ml. The pH is maintained at 10 with 1M NaOH via an automatic titration. In total, 170 ml of 1M NaOH are added. Then, to the peels, ethanol is added and filtered through a glass filter. The peels are rinsed with 1 liter of 100% ethanol and dried in the air at room temperature on filtering paper.

Oxidation of the Peels after Termamyl Treatment 30 grams of peels, which are treated with Termamyl as described in earlier reports, are stirred up with a top stirrer in 800 ml of water. To this are added 1 gram of TEMPO and 0.25 gram of NaBr. The pH is brought to 10 with NaOH and 75 ml of NaOCl are added in portions of 5 ml. During the reaction, the pH is maintained at 10 with 1M NaOH via an automatic titration. In total, 71.4 ml of 1M NaOH are added. Thereupon, to the peels, 800 ml of ethanol are added and filtered. Then, the peels are rinsed with 11 liters of ethanol and dried in the air at room temperature on filtering paper.

Acetylation of Peels

Recipe 1:
To 50 grams of peels (1) 250 ml of water are added. The pH is brought to 9 and maintained under pH stat conditions. 5.40 grams of acetic acid anhydride are added in portions of 0.22 gram. For the total reaction and pH adjustment, 107 mmol of NaOH are added. Afterwards, the mixture is neutralized and filtered through a glass filter. This reaction has also been carried out at pH 8 under pH stat conditions.

Recipe 2:
200 grams of peels (2) are stirred up in 700 ml of water whereupon the pH is brought to 8. To the slurry, 50 ml of acetic acid anhydride are added in portions of 2.5 ml. The pH is maintained at 8 via an automatic titration with NaOH (1M and 33% NaOH solution). Hereupon, the slurry is neutralized with 4M HCl and filtered, rinsed with 500 ml of water and 1 liter of 100% alcohol. The peels are dried in the air at room temperature on filtering paper.

Results

An important preference to be met by a soil cover according to the invention is the capacity of forming a dense layer, so that a good covering of the soil is obtained. For forming a dense layer, use is made of a binder. This binder can be obtained through modification of the carbohydrate fraction in the potato steam peel via, for instance, oxidizing, cross-linking and hydrophobing (acetylating). With these components, different formulations were tested from which, subsequently, 5 formulations were selected for a field test in container cultivation. From these formulations it has appeared that the starch, already present and gelatinized, can also serve as binder.

Characterization of the Raw Materials

For the research, two types of potato steam peels (PSP) were used, i.e. washed peels (peels 1) and additionally washed peels (peels 2). These peels were subsequently treated with enzymes (for instance Termamyl) for hydrolyzing the starch fraction so that a cork fraction is obtained, which is representative of the fraction obtained after fermentation of starch to alcohol. In addition, the two types of PSP were used without them having been processed with enzymes.

The carbohydrate fractions of the PSP were analyzed with the DIONEX system (PPAEC{high pressure anion exchange chromatography}). This analysis is preceded by, first, hydrolyzing for 1 hour in 12 M of sulfuric acid at 35° C., followed by 1 hour of hydrolysis in 2 M sulfuric acid at 100° C. In addition, the peels were also hydrolyzed in only 2 M sulfuric acid.

The analyses show that both the additionally rinsed peels (peels 2) and the enzymatically treated peels contain less starch than peels 1, while it can be noted that the enzymatically treated peels contain less starch than the rinsed peels.

Chemical Modification of the Carbohydrate Fraction

In patent literature (for instance WO 96/09355) is has been described that for adhesion of a top layer to prevent weed growth, the use of additives enabling a better binding of the material, is an important component. Due to this binding, the layer will not be blown away rapidly. These additives are based on polymers such as starch. It may be assumed that this also holds for the cork fraction of the PSP. As the PSP fraction already contains polymeric carbohydrates, it will not be necessary to add, for instance, additional starch. An advantage of the use of PSP is that the starch has already gelatinized and, hence, is readily accessible for chemical modification.

A number of modifications were carried out according to the methods represented in the material and method section, i.e.:
  Oxidizing.
  Substituting with monochloroacetic acid.
  Hydrophobing with octenyl succinic acid or via acetylating with acetic acid anhydride.
  Cross-linking with sodium trimetaphosphate.

It has appeared that the polymeric carbohydrates, in particular starch, are easily modifiable. With this, the properties of the cover layers to be formulated can be influenced.

Formulation of the Cover Layers

On the basis of the cork fraction of the PSP, a number of cover layer formulations were composed, with variation of the type of modified PSP as additive, lignin and palm oil. These formulations are summarized in Table 4.

TABLE 4

Cover layer formulations

| No. | Peels | Addition | Lignosulfonate (%) | Palm oil (%) |
|---|---|---|---|---|
| 1 | Peels (2) dried | 5% TMP Peels | 5 | — |
| 2 | Peels (2) dried | 5% TMP Peels | 5 | 5 |
| 3 | Peels after Termamyl | 5% TMP Peels | 5 | — |
| 4 | Peels after Termamyl | 5% TMP Peels | 5 | 5 |
| 5 | Peels (2) dried | 5% Ac Peels | 5 | — |
| 6 | Peels (2) dried | 5% Ac Peels | 5 | 5 |
| 7 | Peels after Termamyl | 5% Ac Peels | 5 | — |
| 8 | Peels after Termamyl | 5% Ac Peels | 5 | 5 |
| 9 | Peels (1) oxidized | 5% TMP Peels | 5 | — |
| 10 | Peels (1) oxidized | 5% TMP Peels | 5 | 5 |
| 11 | Peels (1) oxidized | 5% Ac Peels | 5 | — |
| 12 | Peels (1) oxidized | 5% Ac Peels | 5 | 5 |
| 13 | Termamyl Peels oxidized | 5% TMP Peels | 5 | — |
| 14 | Termamyl Peels oxidized | 5% TMP Peels | 5 | 5 |
| 15 | Termamyl Peels oxidized | 5% Ac Peels | 5 | — |
| 16 | Termamyl Peels oxidized | 5% Ac Peels | 5 | 5 |
| 17 | Peels (2) dried | 5% TMP Peels | 10 | — |
| 18 | Peels (2) dried | 5% TMP Peels | 10 | 5 |
| 19 | Peels (2) dried | 5% Ac Peels | 10 | — |
| 20 | Peels (2) dried | 5% Ac Peels | 10 | 5 |
| 21 | Peels after Termamyl | 5% TMP Peels | 10 | — |
| 22 | Peels after Termamyl | 5% TMP Peels | 10 | 5 |
| 23 | Peels after Termamyl | 5% Ac Peels | 10 | — |
| 24 | Peels after Termamyl | 5% Ac Peels | 10 | 5 |
| 25 | Peels (1) oxidized | 5% TMP Peels | 10 | — |
| 26 | Peels (1) oxidized | 5% TMP Peels | 10 | 5 |
| 27 | Peels (1) oxidized | 5% Ac Peels | 10 | — |
| 28 | Peels (1) oxidized | 5% Ac Peels | 10 | 5 |
| 29 | Termamyl Peels oxidized | 5% TMP Peels | 10 | — |
| 30 | Termamyl Peels oxidized | 5% TMP Peels | 10 | 5 |
| 31 | Termamyl Peels oxidized | 5% Ac Peels | 10 | — |
| 32 | Termamyl Peels oxidized | 5% Ac Peels | 10 | 5 |
| 33 | Peels (2) dried | 5% TMP Peels | — | — |
| 34 | Peels (2) dried | 5% TMP Peels | — | 5 |
| 35 | Peels (2) dried | 5% Ac Peels | — | — |
| 36 | Peels (2) dried | 5% Ac Peels | — | 5 |
| 37 | Peels after Termamyl | 5% TMP Peels | — | — |
| 38 | Peels after Termamyl | 5% TMP Peels | — | 5 |
| 39 | Peels after Termamyl | 5% Ac Peels | — | — |
| 40 | Peels after Termamyl | 5% Ac Peels | — | 5 |
| 41 | Peels (1) oxidized | 5% TMP Peels | — | — |
| 42 | Peels (1) oxidized | 5% TMP Peels | — | 5 |
| 43 | Peels (1) oxidized | 5% Ac Peels | — | — |
| 44 | Peels (1) oxidized | 5% Ac Peels | — | 5 |
| 45 | Termamyl Peels oxidized | 5% TMP Peels | — | — |
| 46 | Termamyl Peels oxidized | 5% TMP Peels | — | 5 |
| 47 | Termamyl Peels oxidized | 5% Ac Peels | — | — |
| 48 | Termamyl Peels oxidized | 5% Ac Peels | — | 5 |
| 49 | Peels (2) dried | — | — | — |
| 50 | Peels after Termamyl | — | — | — |
| 51 | Peels (1) oxidized | — | — | — |
| 52 | Termamyl Peels oxidized | — | — | — |
| 53 | 50% Peels (2) 50% peel (1) oxidized | 5% TMP Peels | 10 | 5 |
| 54 | 50% Peels (2) 50% peel (1) oxidized | 5% Ac Peels | 10 | 5 |

These cover layers were monitored for three weeks at room temperature for shrinkage, dehydration, water permeability and fungus growth. Also, barley is included as a "weed" in the test as described hereinbelow.

This example is normative for all formulated layers as described in Table 4. Cultivated barley plants are covered with a layer of partially oxidized peels to which 20% lignosulfate has been added. A blank experiment was carried out with barley grain in the soil without cover layer. After a number of weeks, it appears that the cover layer has no influence on the growth of the barley plants. Both grow well (blank and plants with cover layer).

In addition, weed was put into the soil and a cover layer of partially oxidized peels/lignosulfate was superposed. In turn, on the cover layer weed seeds were put. Subsequently, for three weeks, every second day, watering took place. The seeds on the cover layer do not germinate and there are no fungi on the cover layer and no weed grows through the cover layer.

From the results, a number of conclusions can be drawn:
  All layers formulated do not allow weed growth (both weed sown before the layer is applied and weed sown after the layer has been formed.).
  None of the cover layers exhibits fungus formation under the circumstances given. However, it seems that the layers to which vegetable oil has been added, exhibit a budding form of fungus formation. It appears, however, that this budding fungus formation can be obviated by means of fungicides. The cover layers in which TMP peels have been used as addition, dry quickest (approximately 1 week) and exhibit the most shrinkage.
  The cover layers made of oxidized peels appear to remain moist the longest and, hence, exhibit little shrinkage.
  All layers are air and water permeable.
  As to drying rate, the layers to which acetylated peels have been added are between the cover layers with TMP peels as addition and layers with oxidized peels. These layers exhibit less shrinkage than the layers to which TMP has been added.
  When the layers do not dehydrate, the layers will hardly shrink, if at all.
  Layers having 10% lignosulfonate as additive appear to shrink less.

Formulation of Five Cover Layers for a Study in Container Growth.

On the basis of these observations, five formulations were selected for a field test in container growth, i.e.
1) Blank consisting of dried peels with 10% lignosulfonate as additive.
2) Dried peels with an addition of 5% TMP peels and 10% lignosulfonate.
3) Dried peels with an addition of 5% acetylated peels and 10% lignosulfonate.
4) Oxidized peels with 10% lignosulfonate 5) Oxidized peels 50%, with 50% dried peels with 10% lignosulfonate as additive.

From each of the five formulations, 1 kilo was prepared. The field test was carried out on cuttings, projecting above the soil approximately two centimeters and over which the cover layer was scattered. The amount of cover layer per m² was less than 1 kilo. Subsequently, the cuttings were moistened via atomization whereupon plastic is stretched over the plants. As a result, moisture remains high for the purpose of promoting the growth of roots maximally. The temperature in the greenhouse is between 2° C. and 7° C.

After a number of weeks, it appears that only layer number 4 does not exhibit fungus formation. Layers in which native starch is still present do exhibit fungus formation. For this use, it is advisable to previously admix fungicides.

When the starch fraction has modified completely, the fungus growth appears not to occur.

From the field test, the following conclusions are drawn:
- when using a dried peel fraction, preferably, a fungicide will be used
- preferably, the starch fraction is completely removed from the peel fraction, so that fungus growth cannot occur
- the starch fraction can be modified (for instance oxidized) to prevent fungus growth.

As an option, it is noted that admixing, for instance, growth regulating substances or fertilizers (minerals and other nutrients) adds additional value to the cover layer.

TABLE 1

Overview of fungicides (active component and product name)

| active component | product name |
| --- | --- |
| azoxystrobin | Quadris |
| copper | Champ DP |
| copper | Champ Formula 2, Flowable |
| copper | Kocide 2000, DF |
| copper | Kocide 4.5 LF |
| mancozeb | Dithane DF Rainshield NT |
| mancozeb | Dithane F-45 |
| mancozeb | Manex II |
| mancozeb | Manzate 75 DF |
| mancozeb | Penncozeb 75 DF |
| mancozeb | Penncozeb 80 WP |
| mancozeb + copper | ManKocide |
| propiconazole | PropiMax EC |
| propiconazole | Tilt |
| tebuconazole (section 18) | Folicur 3.6 F (section 18) |
| azoxystrobin | Quadris |
| vinclozolin | Ronilan EG |
| chlorothalonil | Bravo Ultrex |
| chlorothalonil | Echo 720 |
| chlorothalonil | Equus DF |
| azoxystrobin | Quadris |
| propiconazole | Tilt |
| vinclozolin | Ronilan EG |
| chlorothalonil | Bravo Ultrex |
| chlorothalonil | Bravo Weatherstick |
| chlorothalonil | Echo 720 |
| chlorothalonil | Echo ZN |
| chlorothalonil | Equus DF |
| copper | Basicop WP |
| copper | Champ DP |
| copper | Champ Formula 2, Flowable |
| copper | Kocide 2000, DF |
| copper | Kocide 4.5 LF |
| iprodione | Rovral 4F |
| maneb | Maneb 75 DF |
| maneb | Maneb 80 |
| maneb | Manex |
| sulfur | Microthiol |
| sulfur | Thiolux |
| thiophanate-methyl | T-methyl |
| thiophanate-methyl | Topsin M WSB |

TABLE 1-continued

Overview of fungicides (active component and product name)

| active component | product name |
| --- | --- |
| sulfur | Kumulus DF |
| sulfur | Micro Sulf |
| sulfur | Thiolux |
| copper | Champ DP |
| copper | Champ Formula 2, Flowable |
| copper | Kocide 2000, DF |
| copper | Kocide 4.5 LF |
| mancozeb | Dithane DF Rainshield NT |
| mancozeb | Dithane F-45 |
| mancozeb | Manex II |
| mancozeb | Manzate 75 DF |
| mancozeb | Penncozeb 75 DF |
| mancozeb | Penncozeb 80 WP |
| mancozeb + copper | ManKocide |
| propiconazole | PropiMax EC |
| propiconazole | Tilt |
| azoxystrobin | Quadris |
| chlorothalonil | Bravo Ultrex |
| chlorothalonil | Bravo Weatherstick |
| chlorothalonil | Bravo ZN |
| chlorothalonil | Echo 720 |
| chlorothalonil | Echo ZN |
| chlorothalonil | Equus DF |
| copper | Basicop WP |
| copper | Champ DP |
| copper | Champ Formula 2, Flowable |
| copper | Kocide 2000, DF |
| copper | Kocide 4.5 LF |
| cymoxanil | Curzate 60 DF |
| dimethomorph | Acrobat 50 WP |
| fluazinam | Omega 500 F |
| iprodione | Rovral 4F |
| mancozeb | Dithane DF Rainshield NT |
| mancozeb | Dithane F-45 |
| mancozeb | Manex II |
| mancozeb | Menzate 75 DF |
| mancozeb | Penncozeb 76 DF |
| mancozeb | Penncozeb 80 WP |
| mancozeb + zoxamide | Gavel 75 DF |
| maneb | Maneb 75 DF |
| maneb | Maneb 80 |
| maneb | Manex |
| mefenoxam + chlorothalonil | Flouronil |
| mefenoxam + chlorothalonil | Ridomil Gold/Bravo WP |
| mefenoxam + copper hydroxide | Ridomil Gold/Copper |
| mefenoxam + mancozeb | Ridomil Gold MZ |
| metiram | Polyram 80 DF |
| propamocarb | Previcur |
| trifloxystrobin | Gem |
| triphenyltin hydroxide | Agri Tin |
| triphenyltin hydroxide | Super Tin 80 WP |
| mancozeb | Dithane DF Rainshield NT |
| mancozeb | Dithane F.45 |
| mancozeb | Manex II |
| mancozeb | Manzate 75 DF |
| mancozeb | Penncozeb 75 DF |
| mancozeb | Penncozeb 80 WP |
| propiconazole | PropiMax EC |
| propiconazole | Tilt |
| chlorothalonil | Bravo Ultrex |
| chlorothalonil | Bravo Weatherstick |
| chlorothalonil | Echo 720 |
| chlorothalonil | Equus DF |
| thiophanate-methyl | T-methyl |
| thiophanate-methyl | Topsin M 70 WSB |
| azoxystrobin | Quadris |
| copper | Basicop WP |
| copper | Champ DP |
| copper | Champ Formula 2, Flowable |
| copper | Kocide 2000, DF |
| copper | Kocide 4.5 LF |
| mancozeb | Dithane DF Rainshield NT |
| mancozeb | Dithane F-45 |
| mancozeb | Manex II |
| mancozeb | Manzate 75 DF |

TABLE 1-continued

Overview of fungicides (active component and product name)

| active component | product name |
|---|---|
| mancozeb | Penncozeb 75 DF |
| mancozeb | Penncozeb 80 WP |
| mancozeb + copper | ManKocide |
| maneb | Maneb 75 DF |
| maneb | Maneb 80 |
| maneb | Manex |
| sulfur | Micro Sulf |
| sulfur | Microthiol |
| sulfur | Thiolux |
| tetraconazole (section 18) | Eminent 125 SL (section 18) |
| thiophanate-methyl | T-methyl |
| thiophanate-methyl | Topsin M WSB |
| trifloxystrobin | Gem |
| triphenyltin hydroxide | Agri Tin |
| triphenyltin hydroxide | Super Tin 80 WP |
| tobuconazole (section 18) | Folicur 3.6 F (section 18) |
| azoxystrobin | Quadris |
| copper | Champ DP |
| copper | Champ Formula 2, Flowable |
| copper | Kocide 2000. DF |
| copper | Kocide 4.5 LF |
| mancozeb | Dithane DF Rainshield NT |
| mancozeb | Dithane F-45 |
| mancozeb | Manex II |
| mancozeb | Manzate 75 DF |
| mancozeb | Penncozeb 75 DF |
| mancozeb | Penncozeb 80 WP |
| mancozeb + copper | ManKocide |
| propiconazole | PropiMax EC |
| propiconazole | Tilt |
| tebuconazole (section 18) | Folicur 3.6 F (section 18) |
| trifloxystrobin + propiconazole | Stratego |

TABLE 2

Overview of herbicides (active components and product names)

|  | 2,4-D |
|---|---|
|  | 2,4-DB |
| AATREX | atrazine |
| ACCENT | nicosulfuron |
| ACCLAIM | fenoxaprop |
| ACCORD | glyphosate |
| ALLY | metsulfuron |
| ARSENAL | imazquin |
| ASSURE II | quizalofop |
| ATRAZINES | atrazine |
| BALAN | benefin |
| BANVEL | dicamba |
| BARRICADE | prodiamine |
| BASAGRAN | bentazon |
| BEACON | primisulfuron |
| BENSULIDE | bensulide |
| BETASAN | bensulide |
| BLADEX | cyanazine |
| BLAZER | acifluorfen |
| BUCTRIL | bromoxynil |
| CASORON | dichlobenil |
| CHOPPER | imazapyr |
| CLARITY | dicamba |
| CLASSIC | chlorimuron |
| COBRA | lactofen |
| DACTHAL | DCPA |
| DEVRINOL | napropamide |
| (dichlorprop) | 2,4-DP |
| DIMENSION | dithiopyr |
| DIQUAT | diquat |
| DUAL | metolachlor |
| DUAL II | metolachlor |
| EPTAM | EPTC |
| ENDURANCE | prodiamine |
| ERADICANE | EPTC |

TABLE 2-continued

Overview of herbicides (active components and product names)

| EXPRESS | tribenuron |
|---|---|
| FINALE | glufosinate |
| FRONTIER | dimethenamid |
| FUSILADE | 2000 fluazifop-P |
| FUSILADE DX | fluazifop-P |
| GARLON | triclopyr |
| GOAL | oxyfluorfen |
| GLEAN | chlorsulfuron |
| GRAMOXONE | paraquat |
| HARMONY | thifensulfuron |
| HARNESS | acetochlor |
| HORIZON | fenoxaprop |
| HYVAR | bromacil |
| IGNITE | glufosinate |
| KARMEX | diuron |
| KERB | pronamide |
| LASSO | alachlor |
| LENTAGRAN | pyridate |
| LEXONE | metribuzin |
| LIBERTY | glufosinate |
| LINEX | linuron |
| LONTREL | clopyralid |
| LOROX | linuron |
| MANAGE | halosulfuron |
| (mecoprop) | MCPP/MCPA |
| MICRO-TECH | alachlor |
| OPTION | fenoxaprop |
| OUST | sulfometuron |
| PARTNER | alachlor |
| PENDULUM | pendimethalin |
| PENTAGON | pendimethalin |
| PERMIT | halosulfuron |
| PINNACLE | thifensulfuron |
| POAST | sethoxydim |
| POAST PLUS | sethoxydim |
| PRAMITOL | prometon |
| PREFAR | bensulide |
| PROWL | pendimethalin |
| PRINCEP | simazine |
| PURSUIT | imazethapyr |
| RAMROD | propachlor |
| REFLEX | fomesafen |
| RELY | glufosinate |
| REWARD | diquat |
| RODEO | glyphosate |
| RO-NEET | cycloate |
| ROUNDUP ULTRA | glyphosate |
| SCEPTER | imazquin |
| SELECT | clethodim |
| SENCOR | metribuzin |
| SINBAR | terbacil |
| SONALAN | ethalfluralin |
| SPIKE | tebuthiuron |
| STARANE | fluroxypyr |
| STINGER | clopyralid |
| STOMP | pendimethalin |
| SURFLAN | oryzalin |
| SURPASS | acetochlor |
| SUTAN + | butylate |
| TELAR | chlorsulfuron |
| TILLAM | pebulate |
| TORDON | picloram |
| TOUCHDOWN | sulfosate |
| TREFELAN | trifluralin |
| TOPNOTCH | acetochlor |
| TOUGH | pyridate |
| TUPERSSAN | siduron |
| TURFLON | triclopyr |
| VANQUISH | dicamba |
| VELPAR | hexazinone |
| VETERAN | dicamba |
| WHIP | fenoxaprop |

TABLE 3

Overview of pesticides 1,2-DICHLOROPROPANE
1-NAPHTHALENEACETAMIDE
1-NAPHTHYLACETIC ACID
2,4,5-T ACID
2,4,5-T AMINE SALTS
2,4,5-T ESTERS
2,4-D-ACID
2,4-DB BUTOXYETHYL ESTERS
2,4-DB DIMETHYLAMINE
ABAMECTIN
ACEPHATE
ACIFLUORFEN SODIUM SALT
ACROLEIN
ALACHLOR
ALDICARB
ALDOXYCARB
ALDRIN
AMETRYN
AMINOCARB
AMITRAZ
AMITROLE
ANCYMIDOL
ANILAZINE
ARSENIC ACID
ASULAM SODIUM
ATRAZINE
AZIMSULFURON
AZINPHOS-MF
BARBAN
BENALAXYL
BENDIOCARB
BENEFIN
BENODANIL
BENOMYL
BENSULFURON ME
BENSULIDE
BENTAZON SODIUM SALT
BIFENOX
BIFENTHRIN
BROMACIL
BROMOXYNIL BUTYRATE
BROMOXYNIL OCTANOATE
BUTACHLOR
BUTYLATE
CAPTAFOL
CAPTAN
CARBARYL
CARBENDAZIM
CARBOFURON
CARBON DISULFIDE
CARBOPHENOTHION
CARBOXIN
CDAA
CHLORAMBEN
CHLORBROMURON
CHLORDANE
CHLORDIMEFORM
CHLORDIMEFORM HCl
CHLORETHOXYFOS
CHLORFENAC SODIUM SALT
CHLORIDAZON
CHLORIMURON ET
CHLOROBENZILATE
CHLORONEB
CHLOROPICRIN
CHLOROPTHALONIL
CHLOROXURON
CHLORPROPHAM
CHLORPYRIFOS
CHLORPYRIFOS-METHYL
CHLORSULFURON
CHLOZOLINATE
CINMETHYLIN
CLOFENTEZINE
CLOMAZONE
CLOPYRALID
CRYOLITE

TABLE 3-continued

Overview of pesticides

CYANAZINE
CYCLOATE
CYFLUTHRIN
CYHALOTHRIN
CYHEXATIN
CYMOXANIL
CYPERMETHRIN
CYROMAZINE
DALAPON SODIUM SALT
DAMINOZIDE
DAZOMET
DBCP
DCNA DICLORAN
DCPA CHLORTHAL-DIMETHYL
DDD
DDE
DDT
DEMETON
DESMEDIPHAM
DI-ALLATE
DIAZINON
DICAMBA
DICHLOBENIL
DICHLONE
DICHLORMID
DICHLOROPROPENE
DICHLORPROP
DICHLORVOS
DICLOFOP-ME
DICOFOL
DICROTOPHOS
DIELDRIN
DIENOCHLOR
DIETHATYL-ET
DIFENZOQUAT ME-SULFATE
DIFLUBENZURON
DIMETHIPIN
DIMETHIRIMOL
DIMETHOATE
DIMETHYLARSINIC ACID
DINITRAMINE
DINOCAP
DINOSEB
DIOXACARB
DIPROPETRYN
DIQUAT DIBROMIDE
DISULFOTON
DIURON
DNOC
DODINE ACETATE SALT
DSMA
ENDOSULFAN
ENDOTHALL
ENDRIN
EPN
EPTC
ESFENVALERATE
ETHALFLURALIN
ETHAMETSULFURON METHYL
ETHEPHON
ETHOFUMESATE
ETHOPROP
ETHYLENE DIBROMIDE
ETRIDIAZOLE
FENAMINOSULF
FENAMIPHOS
FENARIMOL
FENBUTATIN OXIDE
FENFURAM
FENITROTHION
FENOPROP
FENOXAPROP-ET
FENOXYCARB
FENPROPATHRIN
FENSULFOTHION
FENTHION
FENURON

TABLE 3-continued

Overview of pesticides

FENVALERATE
FERBAM
FLUAZIFOP-BUTYL
FLUAZIFOP-P-BUTYL
FLUCHLORALIN
FLUCYTHRINATE
FLUMETRALIN
FLUMETSULAM
FLUOMETURON
FLUPYRSULFURON METHYL
FLURIDONE
FLUSILAZOLE
FOMESAFEN
FONOFOS
FORMETANATE HCl
FOSAMINE AMMONIUM
FOSETYL ALUMINUM
GLUFOSINATE-AMMONIUM
GLYPHOSATE
HALOXYFOP-METHYL
HEPTACHLOR
HEXACHLOROBENZENE
HEXAZINONE
HYDRAMETHYLNON
IMAZALIL
IMAZAMETHABENZ-ME P-ISOMER
IMAZAPYR ACID
IMAZAPYR ISOPROPYLAMINE SALT
IMAZAQUIN-ACID
IMAZAQUIN AMMONIUM
IMAZETHAPYR
IPRODIONE
ISAZOFOS
ISOFENPHOS
ISOPROPALIN
ISOXABEN
LACTOFEN
LENACIL
LINDANE
LINURON
MALATHION
MALEIC HYDRAZIDE ACID
MALEIC HYDRAZIDE K SALT
MANCOZEB
MANEB
MCPA
MCPB
MECOPROP
MEFLUIDIDE
MEPIQUAT CHLORIDE
METALAXYL
METALDEHYDE
METHAM SODIUM
METHAMIDOPHOS
METHAZOLE
METHIOCARB
METHOMYL
METHOXYCHLOR
METHYL BROMIDE
METHYL ISOTHIOCYANATE
METHYL PARATHION
METIRAM
METOLACHLOR
METRIBUZIN
METSULFURON ME
MEVINPHOS
MEXACARBATE
MIREX
MOLINATE
MONOCROTOPHOS
MONOLINURON
MONURON
MSMA
MYCLOBUTANIL
NALED
NAPHTHALENE
NAPROPAMIDE

TABLE 3-continued

Overview of pesticides

NAPTALAM SODIUM SALT
NEBURON
NICOSULFURON
NITRAPYRIN
NORFLURAZON
ORYZALIN
OXADIAZON
OXAMYL
OXYCARBOXIN
OXYDEMETON-ME
OXYFLUORFEN
PACLOBUTRAZOL
PARAQUAT DICHLORIDE
PARATHION
PEBULATE
PENDIMETHALIN
PENTACHLOROPHENOL
PERFLUIDONE
PERIMIPHOS-ETHYL
PERMETHRIN
PHENMEDIPHAM
PHENTHOATE
PHORATE
PHOSALONE
PHOSMET
PHOSPHAMIDON
PICLORAM
PIPERALIN
PIRIMICARB
PIRIMIPHOS-ETHYL
PRIMISULFURON-METHYL
PROCHLORAZ
PROCYMIDONE
PRODIAMINE
PROFENOFOS
PROFLURALIN
PROMECARB
PROMETON
PROMETRYN
PROPACHLOR
PROPAMOCARB HCL
PROPANIL
PROPARGITE
PROPAZINE
PROPHAM
PROPICONAZOLE
PROPOXUR
PROPYZAMIDE
PYRETHRINS
PYRITHIOBAC SODIUM
QUINOMETHIONATE
QUINTOZENE
QUIZALOFOP-ET
RESMETHRIN
RIMSULFURON
ROTENONE
SECBUMETON
SETHOXYDIM
SIDURON
SIMAZINE
SIMETRYN
SODIUM CHLORATE
SULFOMETURON-ME
SULPROFOS
TAU-FLUVALINATE
TCA-SODIUM
TEBUTHIURON
TEMEPHOS
TERBACIL
TERBUFOS
TERBUTRYN
TETRACHLORVINPHOS
THIABENDAZOLE
THIDIAZURON
THIFENSULFURON ME
THIOBENCARB
THIOCYCLAM-HYDROGEN OXIDE

TABLE 3-continued

Overview of pesticides

THIODICARB
THIOPHANATE-ME
THIRAM
TOLCLOFOS-METHYL
TOXAPHENE
TRALOMETHRIN
TRIADIMEFON
TRIADIMENOL
TRIALLATE
TRIASULFURON
TRIBENURON-ME
TRIBUFOS
TRICHLORFON
TRICHLORONAT
TRICLOPYR
TRICYCLAZOLE
TRIDIPHANE
TRIFLUMIZOLE
TRIFLURALIN
TRIFLUSULFURON METHYL
TRIFORINE
TRIMETHACARB
VINCLOZOLIN
ZINEB
ZIRAM

REFERENCES

EP 0 143 913 A2: Material zur Wachstumforderung, Verfahren zur Herstellung eines derartigen Materials und Verwendung von Materialien dieser Art (publication date Jun. 10, 1985)

U.S. Pat. No. 5,077,935: Mulch cover (publication date Jan. 7, 1992)

WO 96/09355: Covering material for agricultural and horticultural soil (publication date Mar. 28, 1996)

EP 0 898 881 A1; Ground covering materials and applications thereof (publication date Mar. 3, 1999)

WO 00/22916; Agent for covering a soil surface (publication date Apr. 27, 2000)

WO 00/58085; Packaging and structural materials comprising potato peel waste (publication date Oct. 5, 2000)

The invention claimed is:

1. A soil cover, characterized in that it comprises potato steam peels:
   a) wherein a carbohydrate fraction has been subjected to chemical modification treatment resulting in reduced availability of starch and hemicellulose carbohydrates for micro-organisms; and
   b) in which the starch and hemicellulose carbohydrate content has been reduced,
   further characterized in that the starch and hemicellulose carbohydrates are reduced to 28% or less in case a).

2. A soil cover according to claim 1, characterized in that it comprises a cork fraction of potato steam peels.

3. A soil cover according to claim 1, characterized in that the potato steam peels are at least partially dried.

4. A soil cover according to claim 1, characterized in that the potato steam peels have undergone a further chemical modification, at least partially.

5. A soil cover according to claim 1, characterized in that the carbohydrate fraction comprises starch that has undergone a chemical modification.

6. A soil cover according to claim 5, wherein at least 20% of the carbohydrates have been oxidized.

7. A soil cover according to claim 1, characterized in that the chemical modification is at least partial oxidation.

8. A soil cover according to claim 1, characterized in that it further comprises at least one additive.

9. A soil cover according to claim 8, characterized in that the additive is a herbicide.

10. A soil cover according to claim 8, characterized in that the additive is a herbicide.

11. A soil cover according to claim 8, wherein the additive is a binding agent.

12. A soil cover according to claim 1, further comprising at least one fungicide.

13. A soil cover according to claim 12, wherein the fungicide is a lignin or a lignin derivative.

* * * * *

UNITED STATES PATENT AND TRADEMARK OFFICE
CERTIFICATE OF CORRECTION

PATENT NO. : 7,597,753 B2 Page 1 of 1
APPLICATION NO. : 10/535968
DATED : October 6, 2009
INVENTOR(S) : Theodoor Maximilaan Slaghek et al.

It is certified that error appears in the above-identified patent and that said Letters Patent is hereby corrected as shown below:

Item (73) on the title page of the patent should read,
(73) Assignee: Nederlandse Organisatie voor toegepast-natuurwetenschappelijk onderzoek TNO (NL)

Signed and Sealed this
Ninth Day of August, 2011

David J. Kappos
*Director of the United States Patent and Trademark Office*